United States Patent [19]
Kolczynski

[11] Patent Number: 6,100,930
[45] Date of Patent: Aug. 8, 2000

[54] PROCESS AND APPARATUS FOR PERFORMING WIPES ON COMPRESSED MPEG VIDEO BITSTREAMS

[75] Inventor: Ronald Joseph Kolczynski, Hamilton, N.J.

[73] Assignee: Thomson Consumer Electronics, Inc., Indianapolis, Ind.

[21] Appl. No.: 08/994,079

[22] Filed: Dec. 19, 1997

[51] Int. Cl.[7] .............................. H04N 7/12; H04N 11/02; H04N 11/04
[52] U.S. Cl. ........................................... 348/408; 348/594
[58] Field of Search .................................... 348/399, 400, 348/403, 408, 420, 725, 575, 576, 578, 594, 595; H04N 7/12, 11/02, 11/04

[56] References Cited

U.S. PATENT DOCUMENTS

| | | | |
|---|---|---|---|
| 4,935,815 | 6/1990 | Ichikawa et al. | 348/594 |
| 5,229,855 | 7/1993 | Siann | 348/594 |
| 5,737,021 | 4/1998 | Chun | 348/408 |
| 5,825,433 | 10/1998 | Yamada et al. | 348/594 |
| 5,909,539 | 5/1999 | Angell | 348/594 |

*Primary Examiner*—Vu Le
*Assistant Examiner*—Nhon T. Diep
*Attorney, Agent, or Firm*—Joseph S. Tripoli; Ronald H. Kurdyla; Alexander J. Burke

[57] ABSTRACT

A method and apparatus for producing a wipe sequence on a display device from incoming compressed video bitstreams, accomplishes the wipe function processing entirely in the compressed domain of the compressed video bitstreams. The old and new video bitstreams or sequences separately undergo a 2-dimensional convolution between its decoded DCT coefficients and stored DCT coefficients of a particular known wipe function. Each convolved bitstream is buffered with its quantization scale and then summed with the other. The summed output bitstream is used by a multiplexer along with each bitstream's decoded macroblock data to provide a seamed output bitstream. A controller controls the process such as frame correlation for convolution and output multiplexing of the summed bitstreams.

12 Claims, 2 Drawing Sheets

PROCESS AND APPARATUS FOR PERFORMING WIPES ON COMPRESSED MPEG VIDEO BITSTREAMS

GOVERNMENT LICENSE RIGHTS IN FEDERALLY SPONSORED RESEARCH AND DEVELOPMENT

The U.S. Government has a paid-up license in this invention and the right in limited circumstances to require the patent owner to license others on reasonable terms as provided for by the terms of contract No. 70NANB5H1174 awarded by the National Institute of Standards and Technology.

INCORPORATION BY REFERENCE

The NIST HDTV Studio System Requirements Document, rev. 3.0, of Mar. 8, 1996, in its entirety, is hereby specifically incorporated herein by reference. The MPEG-2 (Motion Pictures Experts Group) specification standards of MPEG-2 Video (ISO 13818-2) and MPEG-2 Audio (ISO 13818-1) is hereby specifically incorporated herein by reference.

BACKGROUND OF THE INVENTION a. Field of the Invention

The present invention relates to digital signal manipulation and, more particularly, to performing wipe functions on compressed MPEG video.

b. Description of the Prior Art

A very common video switching effect is a wipe. A wipe is essentially the switching between two or more sources of video incrementally over the course of several frames. There are several ways in which a wipe can be effected. One such way is a horizontal sweep where video from a second source replaces video from a first source with the sweep taking a number of frames for completion. Another, more complicated way to effect a sweep, is by a circular wipe. In the circular wipe, the new or second video source starts out as a small circle within the original or first video source and then progressively replaces the first source with larger circles each frame.

Wipes are one of the functions of a production switcher in a television studio. In a digital studio architecture, such as the NIST ATP High Definition Broadcast Technology project, the production switcher operates on streams of video that are, in their lowest level, in an MPEG-2 format. While these streams may be packed in ATM (Asynchronous Transmission Mode) cells, the cells are composed of MPEG-2 video bitstreams that have, at their lowest level, block-based DCT (Discrete Cosine Transform) coefficients.

A desirable goal of processing these MPEG-2 video bitstreams within a studio environment is the ability to manipulate video without leaving the compressed (MPEG) domain.

It is thus an object of the present invention to provide a method and apparatus for effecting manipulation of a compressed video bitstream.

It is further an object of the present invention to provide a method and appparatus for performing a wipe function on compressed video bitstreams, especially MPEG video bitstreams.

It is still further an object of the present invention to provide a method and apparatus for performing wipes of any complexity on MPEG video bitstreams, especially those composed of all I frames.

SUMMARY OF THE INVENTION

The present invention is a method and apparatus for processing compressed digital video bitstreams, such as MPEG-2 video bitstreams, to effect wipes on a display device, the processing being accomplished entirely in the compressed domain. Such wipes are used by production switchers in production studios.

Each incoming compressed bitstream is separately and partially decoded to obtain block-based DCT coefficients, frame information, and higher order information such as slice and macroblock header. Addressable memory stores DCT coefficients for various wipe functions. The block-based DCT coefficients of the compressed bitstream and the DCT coefficients for the selected wipe function are passed to a 2-dimensional convolution circuit wherein convolution of the two sets of DCT coefficients is effected. Each convolved bitstream is buffered with its quantization values and summed with each other. The summed bitstream output is then multiplexed with the original macroblock headers. The multiplexer output is a compressed MPEG video bitstream that effects the wipe sequence. A controller in communication with the addressable memory and the multiplexer provides the control necessary to effect the selected wipe.

Frame information for the incoming compressed bitstreams are preferrably forwarded to the addressable memory and is used by the controller to align the frames of the incoming bitstream and the wipe function bitstream.

BRIEF DESCRIPTION OF THE DRAWINGS

So that the manner in which the above recited features, advantages and objects of the present invention are attained and can be understood in detail, a more particular description of the invention briefly summarized above, may be had with reference to the embodiment which is illustrated in the appended drawings, wherein.

It is to be noted, however, that the appended drawings illustrate only a typical embodiment of the invention and are therefore not to be considered limiting of its scope, for the invention may admit to other equally effective embodiments.

DETAILED DESCRIPTION OF THE INVENTION

Figure 1A:
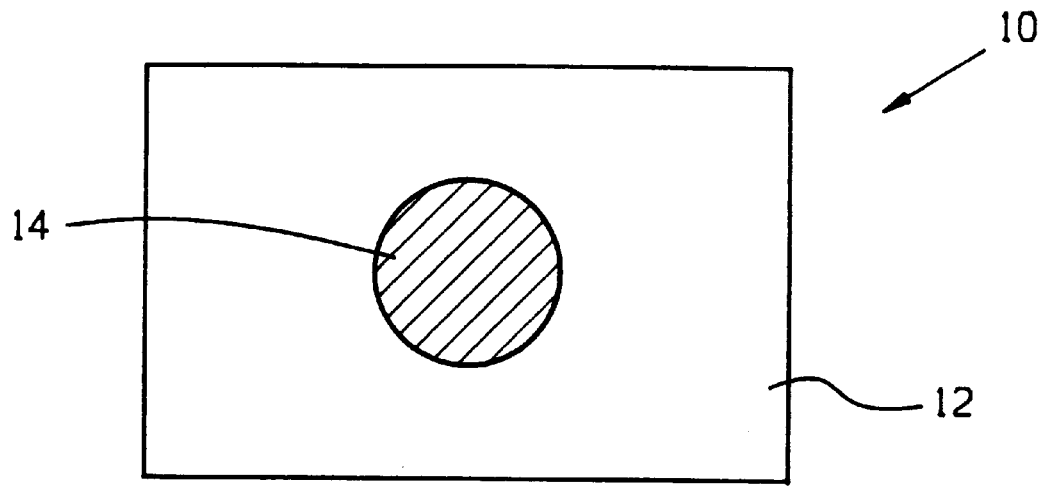
FIG. 1A is a generic representation of a frame of one-half of a circular wipe function being performed on a current video bitstream.
Figure 1B:
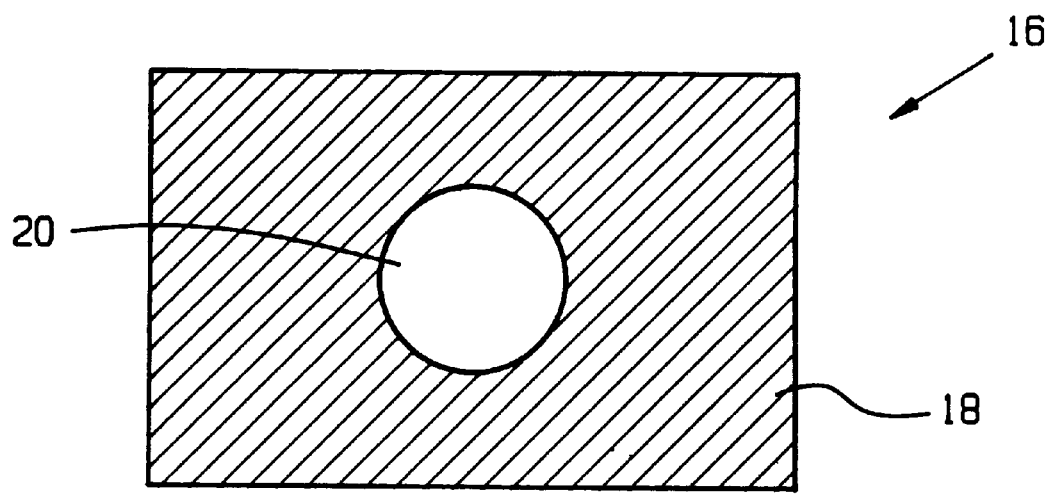
FIG. 1B is a generic representation of a frame of one-half of a circular wipe function being performed on a new video bitstream, the representation being complementary of the representation of FIG. 1A.

In FIG. 1A there is represented a frame of a video sequence A, generally designated 10. In FIG. 1B there is represented a correlating frame of a video sequence B, generally designated 16. Complementary circular wipe functions are being applied to each video sequence A and B to effect a single video wipe sequence on a display device. It should be understood that while FIGS. 1A and 1B depict a circular wipe sequence, the principles of the present invention allow any type of wipe function to be performed. Thus, the effected wipe sequence may be polygonal, a horizontal or vertical sweep, or any complex pattern. In a wipe function, new video sequentially replaces old video generally on a frame by frame basis. FIGS. 1A and 1B depict what occurs to the old and new video on a frame by frame basis during a wipe sequence and not what is actually shown on the display device. As is explained further below, the resulting video shown on the display device (the wipe sequence) is a convolved or combined sequence between what is happening in FIGS. 1A and 1B.

The old video sequence to be replaced is depicted in FIG. 1A while the new, replacement video sequence is depicted in FIG. 1B. In FIG. 1A, the area designated 12 displays or represents the old video while the circular area 14 depicts the blank or blanking area of the old video. As the wipe sequence is effected, the circular area 14 gets progressively larger until area 12 is completely filled. In this manner, the erased portion 14 replaces the old video. In FIG. 1B, the circular area designated 20 displays or represents the new video while the area 18 represents the blank or blanking area thereof.

In the time domain, the wipe function as applied to the video sequence of of FIG. 1A is equivalent to multiplying the old video sequence by a function that has coefficients of 1.0 at pixel locations corresponding to the video area 12 and coefficients of 0.0 at pixel locations corresponding to the circular area 14. In other words, where the old video sequence has not been "wiped", the pixels retain their value since 1.0 times the pixel quantity is equal to the pixel quantity. Where the old video sequence is "wiped", the pixel values would be 0.0 times the pixel quantity, thus 0.0. The wipe function as applied to the video sequence of FIG. 1B is equivalent to multiplying the new video sequence by a function that has coefficients of 1.0 at pixel locations corresponding to the circular area 20 and coefficients of 0.0 at pixel locations corresponding to the area 18. Thus, in the circular area 20, the new video has the pixel values of the new video sequence since 1.0 time the pixel value equals the pixel value, and where the pixel value is 0.0 times the pixel value, the pixel value would be equal to 0.0.

It should also be understood that while the present wipe sequence has been described above as being separate, they are performed concurrently to create the total wipe effect. In other words, the two sequences of FIGS. 1A and 1B are summed to form a singel sequence and with each progressive frame, as the circle gets larger, the FIG. 1B sequence fills more of the display until the new video sequence completely replaces the old video. The two wipe functions as applied are complementary in that where one has coefficients of 1.0, the other has coefficients of 0.0 and vice versa.

Figure 2:
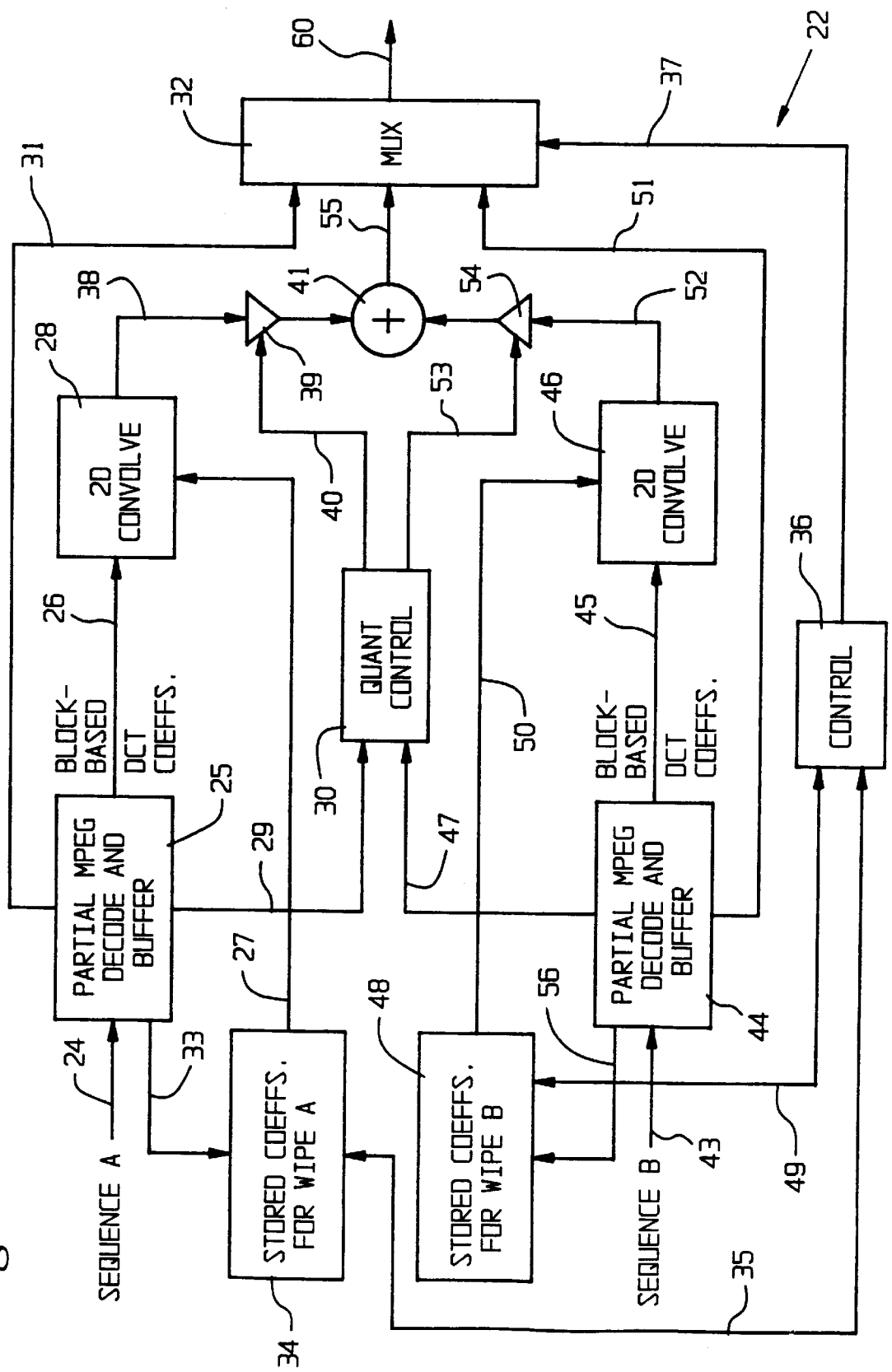
FIG. 2 is a block level diagram implementing the principles of the present invention.

For MPEG-2 bitstreams in which blocks of pixels are represented by DCT coefficients, it is an aspect of the present invention to operate on the DCT coefficients rather than converting from the DCT domain to the pixel value domain and then back to the DCT domain after processing. It is also assumed that there are all I frames in all sequences being switched. With reference now to FIG. 2, there is depicted a block diagram 22 in accordance with the present invention. Imagine the DCT being performed on every block in every frame of the particular wipe function that operates on sequence A (coefficient values of 1.0 outside the circle, and 0.0 inside the circle), and these DCT are stored. A similar procedure is performed on the complementary wipe function that operates on sequence B, and these DCT coefficients are stored. If the wipe takes twenty (20) frames, for example, to be performed, there are now twenty (20) frames of block-based DCT coefficients for the sequence A wipe function and twenty (20) frame of block-based DCT coefficients for the sequence B wipe function. However, for each frame, there are many blocks that lie entirely in the region where the pixel coefficients are either totally 1.0 or 0.0. The DCT for blocks lying entirely in the 1.0 region will consist of just a DC term, while the DCT for blocks lying entirely in the 0.0 region will be zero. The only blocks that will have AC coefficients are those blocks that, in the pixel domain, have both 1.0 and 0.0 pixel coefficients. Depending upon the exact pattern of 1.0 and 0.0 coefficients within the block, the DCT coefficients for these blocks will be different for every unique pattern of 1.0 and 0.0 coefficients. If a particular wipe pattern is already known, say for example a circular wipe over 15 frames, all of the DCT coefficients for that function for all of the frames of the sequence A wipe and the complementary sequence B wipe will be known and thus can be stored in memory. Thus for any type of wipe function, such as a circular wipe function, a horizontal wipe function, a vertical wipe function, a polygonal wipe function, or otherwise, over any number of specified frames, the DCT coefficients for the wipe function for sequence A and the complementary sequence B can be predetermined and stored for operation upon the respective video sequences.

Since, in the time domain, the wipe sequence is equivalent to multiplying sequence A by its wipe function and sequence B by its wipe function and then summing the two, an equivalent operation on the DCT coefficients is convolution.

With reference now to FIG. 2, there is shown a block diagram of the implementation of the principles of the present invention. The sequence A video bitstream (arbitrarily the old or currently displayed video bitstream or sequence) is routed via input 24 into a partial MPEG decoder and buffer 25. The partial MPEG decoder and buffer 25 decodes the incoming sequence A bitstream down to its block-based DCT coefficients to pass the block-based DCT coefficients of the incoming sequence A bitstream via line 26 to a 2-dimensional (2D) convolution (convolver) circuit 28. The MPEG decoder and buffer 25 also decodes and passes quantization values used for the block being processed to a quant control circuit 30 via line 29. Additionally, the MPEG decoder and buffer 25 passes higher order (slice and macroblock header) information to an output multiplexer 32 via line 31, and passes frame information via line 33 to a memory device 34. Some buffering is necessary at the decoder 25 so that the bitstreams from the decoder and buffer 25 and the memory 34 can be aligned block by block at the convolution circuit 28. The DCT coefficients from the memory 34 reach the convoler 28 via line 27. The memory device 34 also stores all of the DCT coefficients for every sequence A wipe function, whether the wipe function is the circular wipe function as in FIGS. 1A and 1B or another wipe function such as a vertical or horizontal wipe. The DCT coefficients of the particular wipe function selected which are stored in the memory device 34 are addressed by the MPEG decoder and buffer 25 via line 33.

The sequence A process is controlled by a controller 36 which is in communication with the memory device 34 via line 35. The controller 36 provides the signals necessary to access the selected wipe function's DCT coefficients on the fly as the ouput bitstream from the multiplexer 32 is being clocked into a production switcher (not shown) via the multiplexer output 60. The controller 36 must also keep track of the two (or more) bitstreams being switched, convolved, and summed. Therefore, the controller 36 must keep the bitstreams aligned by the frame information of the particular incoming bitstream which it uses to control the output of the multiplexer 32 via control line 37. This is accomplished by the controller 36 addressing the frame information from the memory 34 as received from the decoder and buffer 25. The stored DCT coefficients for the particular wipe function selected by the user and inputted into the controller 36 are forwarded via line 27 to the 2D convolver 28 along with the block-based DCT coefficients from the MPEG decoder and buffer 25. This step is non-trivial only when there are both 1.0 and 0.0 coefficients contained in the same block (and, consequently its complement). The blocks of the wipe function for sequence A that have mixed pixel domain coefficients of 1.0's and 0.0's will have their own sets of DCT coefficients with up to 64 nonzero terms. These need to be convolved with the DCT block coefficients for the appropriate block in the corresponding video stream. One of the convolution techniques such as the overlap-add or overlap-save method could be used. Further, during convolution, appropriate scale factors must be used to properly take into consideration each of the block's quantization matrices.

The block based DCT coefficients of sequence A as received from the decoder and buffer 25 via line 26 by the 2D convolver 28 are convolved with the selected wipe function's DCT coefficients from the memory 34 via line 27 by the 2D convolver 28. The 2D convolver 28 sends the convolved bitstream via line 38 to a buffer 39 where the quant control 30 sends via line 40 the inputted quantization values received from the decoder and buffer 25 to scale the convolved bitstream before summation.

In like manner to sequence A, the sequence B video bitstream (arbitrarily the new video bitstream or sequence) is routed via input 43 into a partial MPEG decoder and buffer 44. The partial MPEG decoder and buffer 44 decodes the incoming sequence B bitstream down to its block-based DCT coefficients to pass the block-based DCT coefficients of the incoming sequence B bitstream via line 45 to a 2-dimensional (2D) convolution (convolver) circuit 46. The MPEG decoder and buffer 44 also decodes and passes quantization values used for the block being processed to a quant control circuit 30 via line 47. Additionally, the MPEG decoder and buffer 44 passes higher order (slice and macroblock header) information to an output multiplexer 32 via line 51, and passes frame information via line 56 to a memory device 48. Some buffering is necessary at the decoder 44 so that the bitstreams from the decoder and buffer 44 and the memory 48 can be aligned block by block at the convolution circuit 46. The DCT coefficients from the memory 48 reach the convoler 46 via line 50. The memory device 48 also stores all of the DCT coefficients for every sequence B wipe function, whether the wipe function is the circular wipe function as in FIGS. 1A and 1B or another wipe function such as a vertical or horizontal wipe. The DCT coefficients of the particular wipe function selected which are stored in the memory device 48 are addressed by the MPEG decoder and buffer 44 via line 56.

The sequence B process is controlled by a controller 36 which is in communication with the memory device 48 via line 49. The controller 36 provides the signals necessary to access the selected wipe function's DCT coefficients on the fly as the ouput bitstream from the multiplexer 32 is being clocked into a production switcher (not shown) via the multiplexer output 60. The controller 36 must also keep track of the two (or more) bitstreams being switched, convolved, and summed. Therefore, the controller 36 must keep the bitstreams aligned by the frame information of the particular incoming bitstream which it uses to control the output of the multiplexer 32 via control line 37. This is accomplished by the controller 36 addressing the frame information from the memory 48 as received from the decoder and buffer 44. The stored DCT coefficients for the particular wipe function selected by the user and inputted into the controller 36 are forwarded via line 50 to the 2D convolver 46 along with the block-based DCT coefficients from the MPEG decoder and buffer 44. This step is non-trivial only when there are both 1.0 and 0.0 coefficients contained in the same block (and, consequently its complement). The blocks of the wipe function for sequence B that have mixed pixel domain coefficients of 1.0's and 0.0's will have their own sets of DCT coefficients with up to 64 nonzero terms. These need to be convolved with the DCT block coefficients for the appropriate block in the corresponding video stream. One of the convolution techniques such as the overlap-add or overlap-save method could be used. Further, during convolution, appropriate scale factors must be used to properly take into consideration each of the block's quantization matrices.

The block based DCT coefficients of sequence B as received from the decoder and buffer 44 via line 45 by the 2D convolver 46 are convolved with the selected wipe function's DCT coefficients from the memory 48 via line 50 by the 2D convolver 46. The 2D convolver 46 sends the convolved bitstream via line 52 to a buffer 54 where the quant control 30 sends via line 53 the inputted quantization values received from the decoder and buffer 44 to scale the convolved bitstream before summation.

The outputs from the buffers 39 and 54 are summed in a summer 41. The output 55 of the summer 41 is the resulting block's DCT coefficients which are then seamed back into the bitstream using the output multiplexer 32 under the control of the controller 36. The multiplexer 32 is passing either sequence A or sequence B bsed on control information from the stored coefficient section, and the resulting output bitstream will be sequence A in areas where the pixel coefficients of its wipe function are totally 1.0 (meaning sequence B's coefficients are 0.0), sequence B in areas where its wipe function is 1.0 (meaning sequence A's coefficients are 0.0), and a combination of both when there are mixed wipe function coefficients of 1.0 and 0.0. For this last case, the control circuitry must intelligently piece together the information in the macroblock headers to make a valid MPEG-2 bitstream.

It is easy to generalize the present invention so that the wipe functions for sequences A and B have different DCT values other than just 1.0 or 0.0, for in the case where the wipe functions have just 1.0 and 0.0 DCT coefficients, the old video will be blanked and replaced by the new video. In the case here the DCT coefficient values for the wipe function are not 1.0 and 0.0, the DCT coefficient values in one wipe function would be X and the other 1.0-X. Thus some other wipe effect other than "blank and replace" would be effected. In the case that one of the wipe functions was a constant value over an entire frame and changed linearly over the course of several frames, this effect would be what is known as a dissolve.

It is also apparent from the foregoing, that the present invention is applicable to any number of incoming bitstreams. Each incoming bitstream would undergo the equivalent processing, with each processed bitstream finally being summed and controlled by the output multiplexer.

What is claimed is:

1. A method for producing a wipe sequence bitstream from a first and second compressed video bitstream, the method comprising the steps of:

a. partially decoding the first compressed video bitstream to obtain its block-based DCT coefficients;

b. providing DCT coefficients for a predetermined wipe function;

c. convolving the block-based DCT coefficients for the first compressed video bitstream with the DCT coefficients of the predetermined wipe function to obtain a first convolved video bitstream;

d. partially decoding the second compressed video bitstream to obtain its block-based DCT coefficients;

e. providing DCT coefficients for a complement wipe function to the predetermined wipe function;

f. convolving the block-based DCT coefficients of the second compressed video bitstream with the DCT coefficients for the complement wipe function to the predetermined wipe function to obtain a second resulting compressed video bitstream; and g. summing the first and second resulting compressed video bitstreams to obtain a compressed output video bitstream.

2. The method of claim 1, where the first and second compressed video bitstreams are MPEG bitstreams.

3. The method of claim 1, wherein the step of partially decoding the first compressed video bitstream includes ascertaining frame information for the first compressed video bitstream, and the step of partially decoding the second compressed video bitstream includes ascertaining frame information for the second compressed video bitstream, and further including the steps of:

a. utilizing the frame information for the first compressed video bitstream to align the block-based DCT coefficients for the first compressed video bitstream with the DCT coefficients for the predetermined wipe function prior to convolution thereof; and b. utilizing the frame information for the second compressed video bitstream to align the block-based DCT coefficients for the second compressed video bitstream with the DCT coefficients of the complement wipe function to the predetermined wipe function.

4. The method of claim 3, wherein the step of partially decoding the first compressed video bitstream further includes ascertaining quantization values for the first compressed video bitstream, and the step of partially decoding the second compressed video bitstream further includes ascertaining quantization values for the second compressed video bitstream, and further including the steps of:

a. scaling the first convolved video bitstream with the quantization values for the first compressed video bitstream prior to the step of summing the first and second convolved video bitstreams; and b. scaling the second convolved video bitstream with the quantization values for the second compressed video bitstream prior to the step of summing the first and second convolved video bitstreams.

5. A method for producing a wipe sequence from a first MPEG video bitstream and a second MPEG video bitstream, the method comprising the steps of:

a. partially decoding the first MPEG video bitstream to obtain its block-based DCT coefficients, frame information, slice and macroblock header information;

b. storing the frame information for the first MPEG video bitstream;

c. providing DCT coefficients for a wipe function;

d. convolving the block-based DCT coefficients for the first MPEG video bitstream with the DCT coefficients for the wipe function to obtain a first convolved video bitstream, the DCT coefficients for the wipe function being frame-aligned with the block-based DCT coefficients for the first MPEG video bitstream through application of the stored frame information for the first MPEG video bitstream;

e. partially decoding the second MPEG video bitstream to obtain its block-based DCT coefficients, frame information, slice and macroblock header information;

f. storing the frame information for the second MPEG video bitstream;

g. providing DCT coefficients for a complement wipe function to the wipe function;

h. convolving the block-based DCT coefficients for the second MPEG video bitstream with the DCT coefficients for the complement wipe function to obtain a second convolved video bitstream, the DCT coefficients for the complement wipe function being frame-aligned with the block-based DCT coefficients for the second MPEG video bitstream through application of the stored frame information for the second MPEG video bitstream;

i. summing the first and second convolved video bitstreams to obtain a summed bitstream; and j. multiplexing the summed bitstream with the slice and macroblock header information for the first MPEG video bitstream, and the slice and macroblock header information for the second MPEG video bitstream to form an output MPEG video bitstream.

6. The method of claim 5, wherein the step of partially decoding the first MPEG video bitstream further includes ascertaining quantization values for the first MPEG video bitstream, and the step of partially decoding the second MPEG video bitstream further includes ascertaining quantization values for the second MPEG video bitstream, and further including the steps of:

a. scaling the first convolved video bitstream with the quantization values for the first MPEG video bitstream prior to the summing step; and b. scaling the second convolved video bitstream with the quantization values for the second MPEG video bitstream prior to the summing step.

7. An apparatus for producing a wipe sequence from a first compressed video bitstream and a second compressed video bitstream, the apparatus comprising:

a first decoder adapted to receive the first compressed video bitstream and extract block-based DCT coefficients therefrom;

a first memory device storing DCT coefficients for a wipe function;

a first convolution circuit in communication with the first decoder and the first memory device, the first convolution circuit adapted to convolve the block-based DCT coefficients from the first compressed video bitstream with the DCT coefficients for the wipe function to obtain a first convolved bitstream;

a second decoder adapted to receive the second compressed video bitstream and extract block-based DCT coefficients therefrom;

a second memory device storing DCT coefficients for a complement wipe function to the wipe function;

a second convolution circuit in communication with the second decoder and the second memory device, the second convolution circuit adapted to convolve the block-based DCT coefficients from the second compressed video bitstream with the DCT coefficients for the complement wipe function to obtain a second convolved bitstream; and a summer in communication with the first and second convolution circuits, the summer adapted to sum the first and second convolved bitstreams to obtain a summed compressed video bitstream.

8. The apparatus of claim 7, wherein the first and second compressed video bitstreams are MPEG video bitstreams.

9. The apparatus of claim 7, wherein the first decoder is also adapted to extract first frame information for the first compressed video bitstream, and the second decoder is adapted to extract second frame information for the second compressed video bitstream, the first convolution circuit utilizing the first frame information to align the respective DCT coefficients prior to convolution thereof, and the second convolution circuit utilizing the second frame information to align the respective DCT coefficients prior to convolution thereof.

10. The apparatus of claim 9, wherein the first decoder further is adapted to extract quantization values for the first compressed video bitstream, the second decoder further is adapted to extract quantization values for the second compressed video bitstream, and further including a quantization circuit in communication with the first and second decoders and the outputs of the first and second convolution circuits, the quantization circuit adapteded to receive the first and second quantization values and respectively scale the first and second convolved bitstreams with the respective first and second quantization values prior to the summer.

11. An apparatus for producing a wipe sequence from a first compressed video bitstream and a second compressed video bitstream, the apparatus comprising:

a first decoder adapted to receive the first compressed video bitstream and extract first block-based DCT coefficients, first frame information, first slice and first macroblock header information therefrom;

a first memory device in communication with the first decoder, the first memory device storing the first frame information and DCT coefficients for a wipe function;

a first convolution circuit in communication with the first decoder and the first memory device, the first convolution circuit adapted to convolve the first block-based DCT coefficients with the DCT coefficients for the wipe function to obtain a first convolved video bitstream, and to frame-align the first block-based DCT coefficients with the DCT coefficients for the wipe function through application of the first frame information;

a second decoder adapted to receive the second compressed video bitstream and extract second block-based DCT coefficients, second frame information, second slice and second macroblock header information therefrom;

a second memory device in communication with the second decoder, the second memory device storing the second frame information and DCT coefficients for a complement wipe function to the wipe function;

a second convolution circuit in communication with the second decoder and the second memory device, the second convolution circuit adapted to convolve the second block-based DCT coefficients with the DCT coefficients for the complement wipe function to obtain a second convolved video bitstream, and to frame-align the second block-based DCT coefficients with the DCT coefficients for the complement wipe function through application of the second frame information;

a summer in communication with the first and second convolution circuits, the summer adapted to sum the first and second convolved video bitstreams; and a multiplexer in communication with the summer and the first and second decoders, the multiplexer utilizing the first and second slices and first and second macroblock headers to form an output compressed video bitstream.

12. The apparatus of claim 11, wherein the first decoder further extracts first quantization values from the first compressed video bitstream and the second decoder further extracts second quantization values from the second compressed video bitstream, and further comprising a quantization circuit in communication with the first decoder and the second decoder, the quantization circuit adapted to receive the first and second quantization values, the quantization circuit further in communication with a first buffer that is interposed between and in communication with the first convolution circuit and the summer, and in communication with a second buffer that is interposed between and in communication with the second convolution circuit and the summer, the first buffer receiving and applying the first quantization values to the first convolved video bitstream, and the second buffer receiving and applying the second quantization values to the second convolved video bitstream.

* * * * *